(12) United States Patent
Gaug

(10) Patent No.: US 9,138,651 B2
(45) Date of Patent: Sep. 22, 2015

(54) UNIVERSAL GAME PEDAL CONTROLLER AND METHOD THEREFOR

(71) Applicant: Jonathan B Gaug, Redmond, WA (US)

(72) Inventor: Jonathan B Gaug, Redmond, WA (US)

( * ) Notice: Subject to any disclaimer, the term of this patent is extended or adjusted under 35 U.S.C. 154(b) by 146 days.

(21) Appl. No.: 14/147,174

(22) Filed: Jan. 3, 2014

(65) Prior Publication Data

US 2014/0378226 A1 Dec. 25, 2014

(51) Int. Cl.
*A63F 13/803* (2014.01)
*A63F 13/245* (2014.01)

(52) U.S. Cl.
CPC .............. *A63F 13/803* (2014.09); *A63F 13/245* (2014.09)

(58) Field of Classification Search
USPC ........................... 463/25–43; 345/156; 434/29
See application file for complete search history.

(56) References Cited

U.S. PATENT DOCUMENTS

| | | | | |
|---|---|---|---|---|
| 5,275,565 A * | 1/1994 | Moncrief | .......................... | 434/29 |
| 6,422,941 B1 * | 7/2002 | Thorner et al. | .................. | 463/30 |
| 8,308,558 B2 * | 11/2012 | Thorner | .......................... | 463/30 |
| 8,636,598 B2 * | 1/2014 | Radek et al. | ..................... | 463/48 |
| 2005/0259070 A1 * | 11/2005 | Hull et al. | ...................... | 345/156 |
| 2005/0278450 A1 * | 12/2005 | Pelletier et al. | ................ | 709/229 |
| 2009/0163283 A1 * | 6/2009 | Childress | ......................... | 463/47 |

* cited by examiner

*Primary Examiner* — Masud Ahmed
(74) *Attorney, Agent, or Firm* — Kenneth E. Barnes

(57) ABSTRACT

A universal game pedal controller and method of emulating the output of multiple game pedal controllers in a universal game pedal controller are disclosed. A universal game pedal controller according to the present invention provides a microcontroller-based interface board for mapping the inputs from multiple pedal sensors to analog outputs of a primary game controller interface having a common adapter cable port, and adapter cables configured to connect the interface board to different primary game controllers. A USB interface may also be provided, permitting connection of the universal game pedal controller to a personal computer. The method provides for calibration of the input signals to the full range of the outputs, whether analog or digital, for increased accuracy and responsiveness.

20 Claims, 3 Drawing Sheets

UNIVERSAL GAME PEDAL CONTROLLER AND METHOD THEREFOR

BACKGROUND OF THE INVENTION

With simulation games providing an ever more realistic in-game environment, with better graphics and better gameplay physics, there has been a demand by some gaming enthusiasts for more realistic controls that add to the immersive experience, by providing such features as force-feedback and more accurate subjective "feel" which is provided using controllers having similar mechanical properties to their real world counterparts. Such premium controllers are available for use with personal computers, where a universal serial bus (USB) interface has long been standard, but in the console gaming market, manufacturers of various consoles have their own proprietary interfaces for compatible controllers, and charge substantial licensing fees for the ability to connect directly to the console. Manufacturers producing controller sets for racing games, for example, have often provided a primary controller, or steering wheel, which interfaces directly to the console, and a secondary controller, or set of pedals, which interfaces with the primary controller. The interfaces provided on the primary controller for these secondary controllers differ among various manufacturers, and there is a need for a universal game pedal controller in the console gaming market, capable of interfacing with a variety of primary game controllers and facilitating a more immersive experience and better "feel" than the pedal controllers provided in existing console gaming controller sets.

DETAILED DESCRIPTION OF THE DRAWINGS

Figure 1:
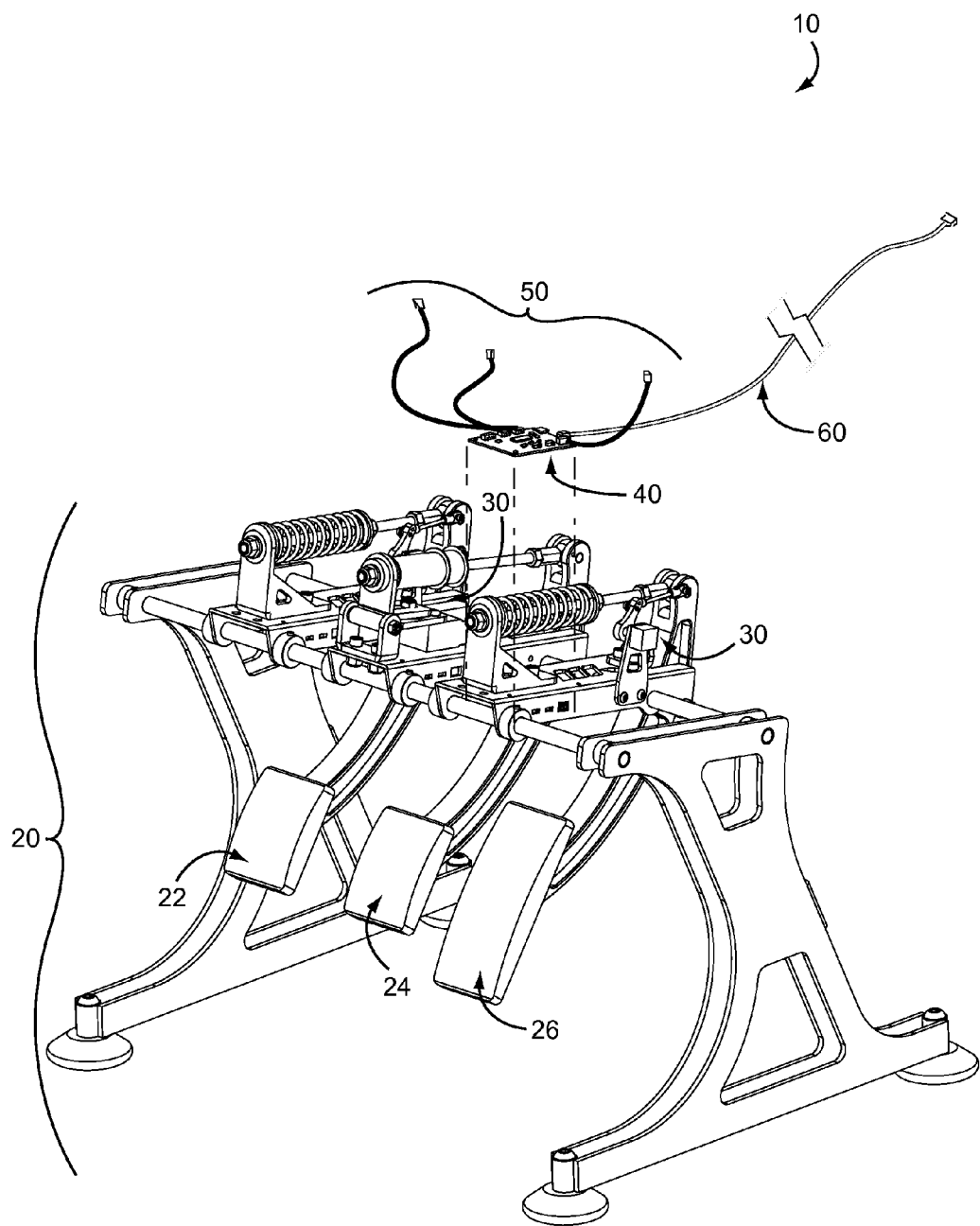
FIG. 1 is a partially exploded perspective view of a universal game pedal controller according to an embodiment of the invention.

The present invention may be embodied in a universal game pedal controller that may be connected to a primary game controller, or alternatively, to a personal computer. FIG. 1 is partially exploded perspective view of a universal game pedal controller according to an embodiment of the invention. The universal game pedal controller 10 comprises a pedal set 20, which may include, for purposes of illustration, an accelerator pedal 26, a brake pedal 24, and a clutch pedal 22; along with sensors 30, sensor cables 50, an interface board 40, and an adapter cable 60. Each pedal in the pedal set 20 is linked as is known in the art to a sensor 30 which produces an electrical signal in response to user movement of the pedal, such as by stepping on the accelerator pedal 26, brake pedal 24, or clutch pedal 22. Each sensor 30 is connected to the interface board 40 by a sensor cable 50, which plugs into the interface board at a designated connector. The pedal sensors 30 may be of any suitable type, such as potentiometers, load cells, hydraulic pressure sensors, and the like, and in a preferred embodiment are potentiometers for the accelerator and clutch pedals, and either a load cell or hydraulic pressure sensor for the brake pedal, depending upon the type of brake pedal mechanism. A load cell brake is shown. The location of the sensor 30 for the clutch pedal 22 is not visible, but is similar to that shown for the accelerator pedal 26. The interface board 40, illustrated schematically in FIG. 2, accepts the electrical signals from each of the pedal sensors 30 as input, digitizes them, transforms the digital representation of the signals received from each pedal sensor 30 according to the method or algorithm illustrated in FIG. 4, and outputs analog signals to a primary game controller over the adapter cable 60, or alternatively, outputs the digital representation of the signals to a personal computer via a USB interface.

Figure 2:
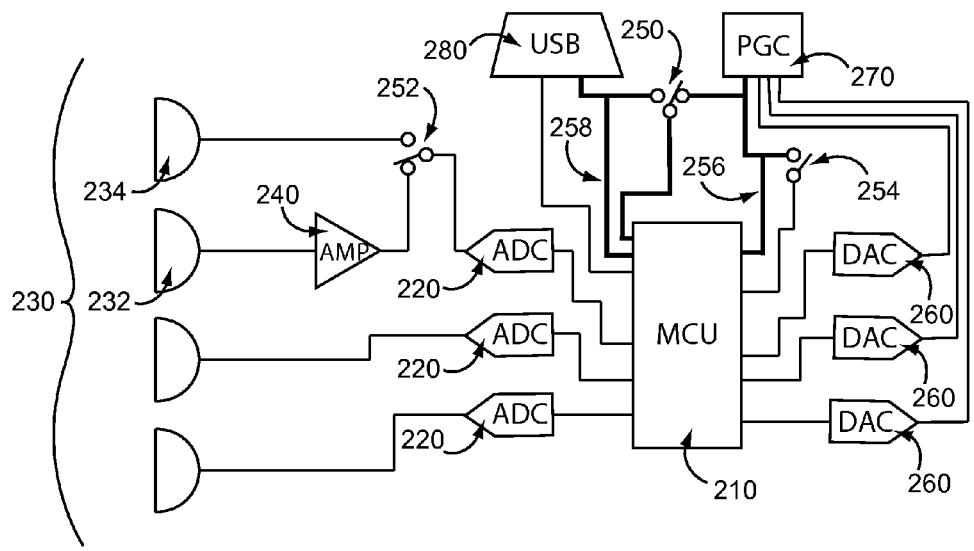
FIG. 2 is a schematic block diagram illustrating the interface board of a universal game pedal controller according to an embodiment of the invention.

FIG. 2 is a schematic block diagram illustrating the interface board of a universal game pedal controller according to an embodiment of the invention. The output of the pedal sensors 230 are digitized by analog-to-digital converters (ADC) 220, and input to a microcontroller (MCU) 210. The ADCs 220 may be discrete electronic components or integrated into the MCU 210. In a preferred embodiment, the MCU 210 contains its own non-volatile memory for storing firmware and configuration data, as well as random access memory (RAM) cache. Depending upon the type of pedal sensor 230 used, amplification of the signal from one or more sensors 230 may be necessary. For example, if the pedal sensor 230 for a brake pedal uses a load cell 232, a load cell amplifier 240 is necessary, whereas if the brake pedal is of the hydraulic type and instead uses a hydraulic pressure sensor 234 as the pedal sensor 230, the amplification would not be necessary. A brake type selector switch 252 may be provided to select the correct input for the brake type that is in use. Alternatively, the correct input for the brake type that is in use may be selected in the MCU's 210 software.

Some primary game controllers use a voltage going to high to signal full activation of a pedal, while others use a voltage going to low to signal full pedal activation. A signal inversion switch 254 may be provided to configure the microcontroller (MCU) 210 for the type of signaling used by the primary game controller. The microcontroller transforms the digital representation of the analog signals from each pedal, and can then output them as analog signals through digital-to-analog converters 260 to the primary game controller (PGC) interface 270.

In addition to outputting analog signals to a primary game controller via the primary game controller interface 270, a universal serial bus (USB) interface 280 may be provided, permitting the digitized representation of the pedal inputs to be sent as data items directly to a personal computer's universal serial bus (USB) host controller. When the USB interface is provided, the MCU 210 can use a PGC sense line 256 from the primary game controller interface 270 and a USB sense line 258 from the USB interface 280 to detect the presence of bus power on either interface and direct its signal output accordingly. These sense lines (256, 258) can also be used to detect an error condition in which the primary game controller interface 270 and the USB interface 280 are both connected, and to trigger an appropriate error handling procedure, such as a reboot until the error condition is removed. A power selector switch 250 can be used to select between the primary game controller interface 270 or USB interface 280, and ensure that bus power from only the selected interface is provided to the interface board. The power selector switch 250 may be implemented in several ways, including as a manual switch, or as an autoswitching power multiplexer, and in a preferred embodiment is implemented as an autoswitching power multiplexer.

If desired, many components of the interface board shown can be integrated into an application specific integrated circuit (ASIC) for ease of manufacture and cost savings, and illustration of these elements as discrete components should not be construed as limiting the scope of the present invention.

Figure 3:
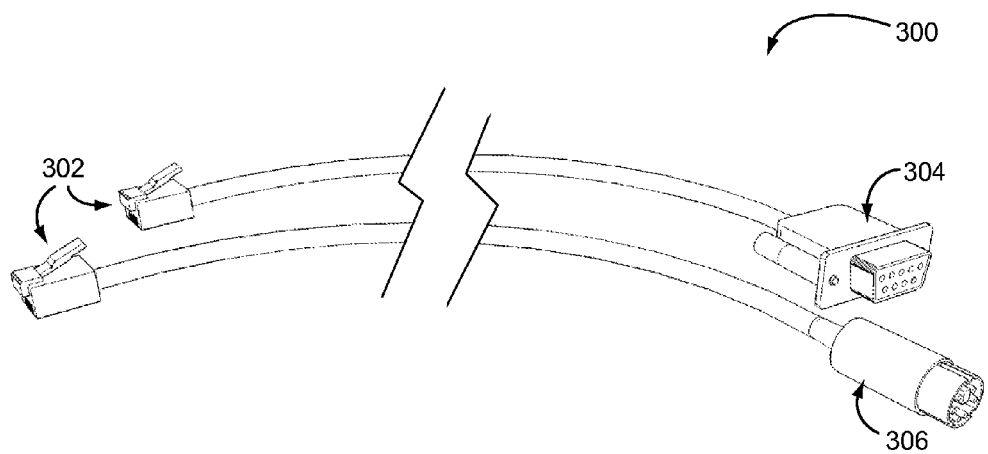
FIG. 3. is an illustration of exemplary adapter cables of a universal game pedal controller according to an embodiment of the invention.

FIG. 3. depicts two kinds of exemplary adapter cables which may be used with a universal game pedal controller according to an embodiment of the invention. The connector pinouts on different primary game controllers are different, requiring a suitable adapter cable 60 (see FIG. 1) be selected. In a preferred embodiment, the adapter cable 60 is selected from a set of adapter cables 300 each having a standard plug at one end, such as an RJ-12 plug 302, and the other end of each adapter cable having the appropriate plug for the type of connector used by the primary game controller, such as as DB-9 plug 304, or PS2 plug 306. Other plugs used by different primary game controllers may include DEC-MMJ, or even another RJ-12. Adapter cables suitable for use with primary game controllers using these plugs may also be part of the set of adapter cables 300. The standard plug end of the adapter cable 60 connects to the primary game controller (PGC) interface (see 270, FIG. 2) of the interface board 40 (FIG. 1). The pinout assignment for the primary game controller plug end of the adapter cable 60 is made by appropriately configuring the wiring within the adapter cable 60 to map the standard pinout of the primary game controller (PGC) interface 270 to the appropriate connector pinouts on the primary game controller.

Figure 4:
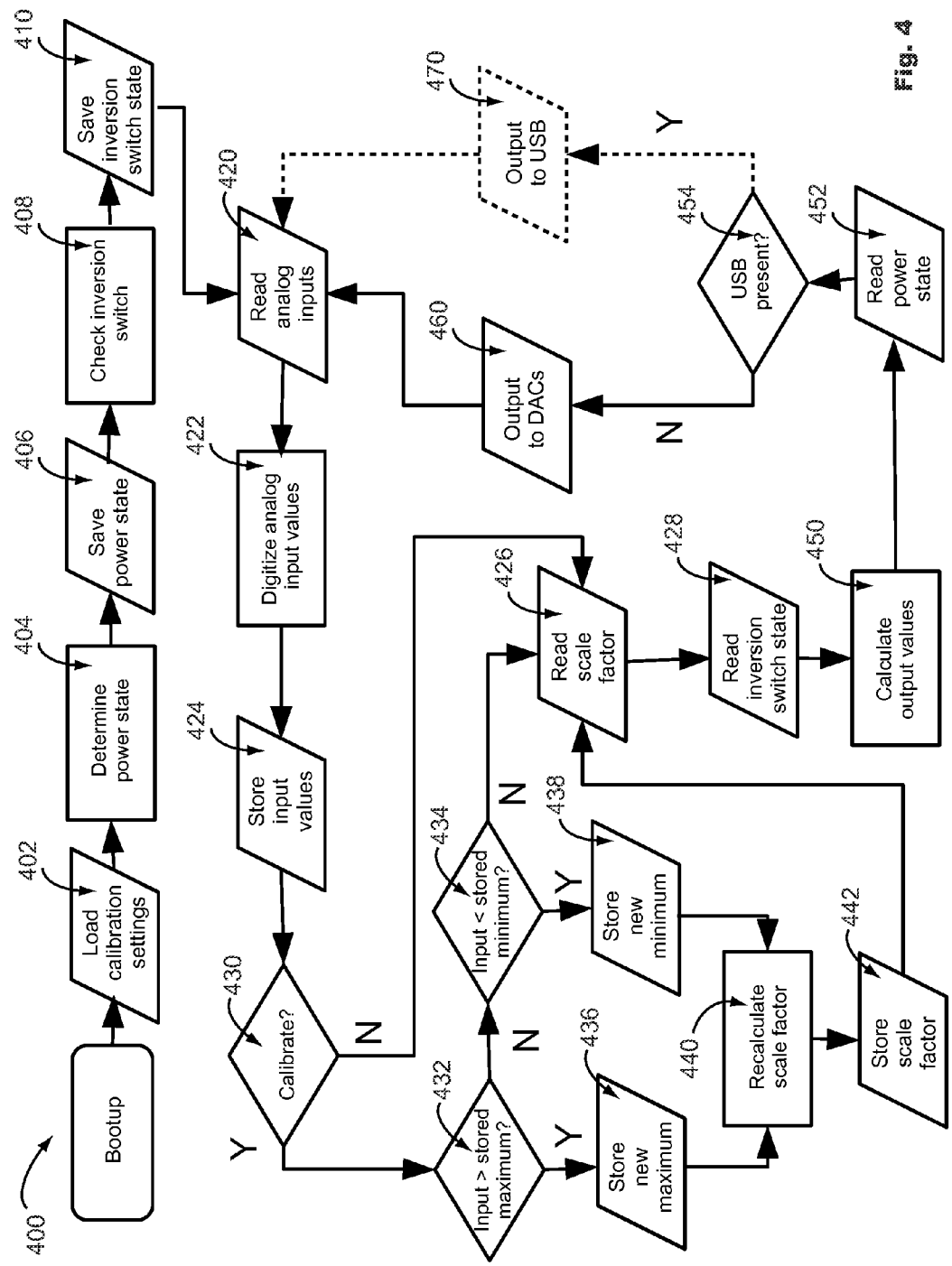
FIG. 4. is a graphical flow chart of a method implemented in the microcontroller algorithm of the interface board of a universal game pedal controller according to an embodiment of the invention.

FIG. 4. is a graphical flow chart of a method or algorithm implemented in the microcontroller of the interface board of a universal game pedal controller according to an embodiment of the invention. These steps will now be described with reference to the various elements or components of the universal game pedal controller 10, and particularly the interface board 40 (see FIGS. 1 and 2). Upon bootup, the microcontroller (MCU) 210 (see FIG. 2) performs a series of preparatory steps 402-410. These steps include loading calibration settings 402 which include the upper and lower range of expected values for each pedal sensor 230; determining the power state 404, i.e. whether bus power is being supplied by the primary game controller interface 270 or the USB interface 280; saving the power state 406; checking the state 408 of the signal inversion switch 254; and saving the inversion switch state 410. These preparatory steps 402-410, it will be understood, may be performed in a different sequence, or at a different time, or may even be optional, depending upon the particular embodiment of the invention. For example, loading the calibration settings 402 for a pedal input could be performed immediately prior to comparison of the input values to the stored maximum and minimum values (432 and 434), and determination of and saving the power state (404 and 406) could be performed immediately prior to reading the power state 452 in preparation for outputting the digitized values either to the DACs 260 or the USB interface 280 (steps 460 and 470, respectively). The steps of determination and saving of the power state (404 and 406) would not be required in the absence of a USB interface 280, and the checking and saving of the signal inversion switch state (408 and 410) would not be required if it were not desired to support certain primary game controllers which require the analog signal to be inverted.

In addition to being a preparatory step, the step of the determination of the power state 404 can also be used to detect an error condition in which the primary game controller interface 270 and the USB interface 280 are both connected, and used to trigger a reboot cycle until the error condition is removed.

The calibration settings loaded in step 402 can be initially set at the factory, or may be stored as part of a user-initiated calibration procedure at initial setup of the universal game pedal controller. They may also calibrated, if desired, at a later time, or periodically, such as at every bootup, or whenever the output interface is changed (e.g. between PGC and USB, or vice versa), or less frequently. It should be noted that due to the finite number of write cycles for non-volatile random access memory (NVRAM) chips used to store the calibration values, in a preferred embodiment the calibration values would not be updated continuously.

Following bootup and any desired preparatory steps 402-410, the MCU 210 begins to process the digitized analog signals from the pedal sensors 230. The analog signals received from each pedal sensor 230 are read in and digitized (steps 420 and 422, respectively) by the ADCs 220, which may be discrete components, or integrated as part of the MCU 210. The digitized input values are then stored 424. The MCU 210 uses the stored digitized input values to calibrate the pedals, and in normal operation.

When calibration 230 is to occur, the MCU 210 compares the digitized analog input values from each pedal sensor 230 to the expected minimum and maximum values for each pedal sensor 230 loaded as part of the calibration settings (steps 432 and 434). Comparison of the input values read in from the pedal sensors 230 to the stored calibration settings (steps 432 and 434) is necessary to obtain as much precision and responsiveness as possible with the pedals and to avoid "dead zones" at the start and end of pedal travel where the input values read in from the pedal sensors 230 exceed the expected maximum or fall below the expected minimum, and the response from the pedals would otherwise be "clipped". Not detecting the full range of the pedal inputs could result, for example, in "laggy" or "stuck" acceleration or braking in the game. If the input values from a particular pedal sensor 230 exceed the expected maximum or fall below the expected minimum for that pedal sensor 230, the new values are stored (steps 436 and 438, respectively), and a new scale factor for that pedal sensor 230 is calculated (440) and stored (442) based upon the new range. This pedal-sensor-specific scale factor is used in the algorithm to map the full range of input values from a given pedal sensor 230 to the full range of output values available on the DACs 260 (such as 0-1023 for a 10-bit DAC) or defined in the data item for that pedal on the USB interface (if present), and in a preferred embodiment the scale factor for each pedal sensor is loaded and stored as part of the calibration settings.

A scale factor for each pedal sensor is calculated 440 by dividing the full output range of the interface in use, whether the DACs 260 (when outputting to the PDC 270) or USB 280, by the difference obtained by subtracting the minimum stored value from the maximum stored value for that pedal sensor. In a preferred embodiment, the full output ranges of the DACs 260 and USB 280 are preselected to be identical, so as to eliminate the need for recalculating the scale factor when switching between the PDC 270 and USB 280 interfaces. The calculated scale factor for each pedal sensor is stored 442 following the calibration procedure.

In normal operation (i.e. following calibration steps 430-442, or if a new calibration 430 was not performed), the MCU 210 maps the digitized analog input values from each pedal sensor 230 to the full output range of the interface in use (either the available range on the DACs, or, if present, the data item defined for each pedal in the USB interface) using each sensor's own scale factor that was previously calculated 440 from the stored minimum and maximum expected values for that pedal sensor 230. The MCU 210 reads or loads the stored scale factor 426 and signal inversion switch state 428. The minimum stored value for the particular pedal sensor is subtracted from the digitized analog input value, and the difference is multiplied by the scale factor to obtain a calculated output value 450, and if the inversion switch state indicates, then subtracted from the maximum output value available on the interface in use (DACs 260 and PGC 270 or USB 280). Depending upon the power state detected 452-454, the digital output values for each pedal are output to the DAC 460 corresponding to that pedal's channel on the primary game controller interface 270 for conversion to analog signals, or output digitally as data items to the USB interface 470 (if present). The next analog input values are then read in 412, and the MCU calculates and outputs updated output values for the next cycle according to the algorithm or method as described above, until the universal game pedal controller loses power or is turned off.

The invention claimed is:

1. A universal game pedal controller comprising:
    at least two pedals selected from the group consisting essentially of an accelerator pedal, a clutch pedal, a right rudder pedal, a left rudder pedal, and a brake pedal;
    a pedal position sensor connected to each pedal of said at least two pedals and configured to produce an electrical signal varying in response to user input according to the position of said each pedal of said at least two pedals;
    at least two analog-to-digital converters, each configured to receive an electrical signal from a pedal position sensor of said pedal position sensors connected to each pedal of said at least two pedals and to produce a corresponding digital sample value;
    a first selector switch, said first selector switch having a first mode and a second mode;
    a microcontroller configured to receive the digital sample values from each of said at least two analog-to-digital converters, said microcontroller further configured to receive input from said first selector switch;
    an algorithm executable by said microcontroller, wherein said digital sample value is mapped to a corresponding digital output value over a predetermined output range, and wherein said corresponding digital output value is inverted when said first selector switch is in the first mode, and wherein said corresponding digital output value is not inverted when said first selector switch is in the second mode;
    at least two digital-to-analog converters, each of said at least two digital-to-analog converters configured to receive a digital output value from said microcontroller and to produce an output electrical signal;
    a primary game controller interface, said primary game controller interface comprising an adapter cable port comprising at least two signal contacts and a ground contact, each of said at least two signal contacts configured to transmit an output electrical signal from a digital-to-analog converter of said at least two digital-to-analog converters;
    an adapter cable having a first end and a second end, said first end configured to connect to said adapter cable port, and said second end configured to connect to a preselected primary game controller, said adapter cable configured to transmit said output electrical signal from each of said at least two signal contacts of said adapter cable port to said preselected primary game controller.

2. The universal game pedal controller of claim 1, wherein at least one of said pedal position sensors is a load cell.

3. The universal game pedal controller of claim 2, further comprising at least one load cell amplifier configured to amplify the electrical signal produced by at least one load cell prior to said electrical signal being received by at least one analog-to-digital converter.

4. The universal game pedal controller of claim 3, further comprising a second selector switch, said second selector switch having a first mode and a second mode, said second selector switch being configured to select the output from least one load cell amplifier when said second selector switch is in the first mode, and to deselect the output from at least one load cell amplifier when said second selector switch is in the second mode.

5. The universal game pedal controller of claim 4, further comprising a universal serial bus (USB) interface configured to receive the corresponding digital output values from said microcontroller and transmit said corresponding digital output values to a universal serial bus (USB) host controller.

6. The universal game pedal controller of claim 5, further comprising a means for sensing the presence of bus power on the universal serial bus (USB) interface, said microcontroller being configured to direct the output of the digital output values from the microcontroller to the universal serial bus (USB) interface when bus power is detected on the universal serial bus (USB) interface, and said microcontroller being configured to direct the output of the digital output values from the microcontroller to the digital-to-analog converters when bus power is not detected on the universal serial bus (USB) interface.

7. The universal game pedal controller of claim 1, further comprising a universal serial bus (USB) interface configured to receive the corresponding digital output values from said microcontroller and transmit said corresponding digital output values to a universal serial bus (USB) host controller.

8. The universal game pedal controller of claim 7, further comprising a means for sensing the presence of bus power on the universal serial bus (USB) interface, said microcontroller configured to direct the output of the digital output values from the microcontroller to the universal serial bus (USB) interface when bus power is detected on the universal serial bus (USB) interface, and said microcontroller being configured to direct the output of the digital output values from the microcontroller to the digital-to-analog converters when bus power is not detected on the universal serial bus (USB) interface.

9. A universal game pedal controller comprising:
    at least two pedals selected from the group consisting essentially of an accelerator pedal, a clutch pedal, a right rudder pedal, a left rudder pedal, and a brake pedal;
    a pedal position sensor connected to each pedal of said at least two pedals, each of said pedal position sensors configured to produce an electrical signal varying in response to user input according to the position of said each pedal of said at least two pedals;
    at least two analog-to-digital converters, each configured to receive an electrical signal from a pedal position sensor of said pedal position sensors connected to each pedal of said at least two pedals and to produce a corresponding digital sample value;
    a first selector switch, said first selector switch having a first mode and a second mode;
    a microcontroller configured to receive the digital sample values from each of said at least two analog-to-digital converters, said microcontroller further configured to receive input from said first selector switch;
    an algorithm executable by said microcontroller, wherein said digital sample value is mapped to a corresponding digital output value over a predetermined output range by subtracting a stored minimum value from the digital sample value and multiplying the difference by a scale factor; and wherein said digital sample value is compared to a stored maximum value to determine whether it is greater than said stored maximum value, and if said digital sample value is greater than said stored maximum value said stored maximum value is updated using said digital sample value; and wherein said digital sample value is compared to a stored minimum value to determine whether it is less than said stored minimum value, and if said digital sample value is less than said stored minimum value said stored minimum value is updated using said digital sample value; and wherein said scale factor is calculated by dividing a predetermined output range by the difference obtained by subtracting said stored minimum value from said stored maximum value; and wherein said corresponding digital output value is inverted when said first selector switch is in the first mode, and wherein said corresponding digital output value is not inverted when said first selector switch is in the second mode;

a universal serial bus (USB) interface configured to receive the corresponding digital output values from said microcontroller and transmit said corresponding digital output values to a universal serial bus (USB) host controller;

at least two digital-to-analog converters, each of said at least two digital-to-analog converters configured to receive a digital output value from said microcontroller and to produce an output electrical signal;

a means for sensing the presence of bus power on the universal serial bus (USB) interface, said microcontroller being configured to direct the output of the digital output values from the microcontroller to the universal serial bus (USB) interface when bus power is detected on the universal serial bus (USB) interface, and said microcontroller being configured to direct the output of the digital output values from the microcontroller to the digital-to-analog converters when bus power is not detected on the universal serial bus (USB) interface;

a primary game controller interface, said primary game controller interface comprising an adapter cable port comprising at least two signal contacts and a ground contact, each of said at least two signal contacts configured to transmit an output electrical signal from a digital-to-analog converter of said at least two digital-to-analog converters;

an adapter cable having a first end and a second end, said first end configured to connect to said adapter cable port, and said second end configured to connect to a preselected primary game controller, said adapter cable configured to transmit said output electrical signal from each of said at least two signal contacts of said adapter cable port to said preselected primary game controller.

10. A method of emulating the output of multiple game pedal controllers in a universal game pedal controller, the method comprising:

providing at least two pedals selected from the group consisting essentially of an accelerator pedal, a clutch pedal, a right rudder pedal, a left rudder pedal, and a brake pedal;

connecting a pedal position sensor to each pedal of said at least two pedals, each of said pedal position sensors configured to produce an electrical signal varying in response to user input according to the position of said each pedal of said at least two pedals;

providing at least two analog-to-digital converters, each configured to receive an electrical signal from a pedal position sensor of said pedal position sensors connected to each pedal of said at least two pedals and to produce a corresponding digital sample value;

inputting the electrical signal from each of said pedal position sensors connected to each pedal of said at least two pedals into an analog-to-digital converter of said at least two analog-to-digital converters and obtaining a corresponding digital sample value;

providing a microcontroller configured to receive the digital sample values from each of said at least two analog-to-digital converters;

providing a first selector switch connected to said microcontroller, said first selector switch having a first mode and a second mode;

providing an algorithm executable by said microcontroller, said algorithm programmed to determine for each digital input value a corresponding digital output value over a predetermined output range and to invert said corresponding digital output value when said first selector switch is in said first mode, and to not invert said corresponding digital output value when said first selector switch is in said second mode;

inputting the digital sample values from each of said at least two analog-to-digital converters into said microcontroller and obtaining corresponding digital output values;

providing at least two digital-to-analog converters, each configured to receive a digital output value from said microcontroller and to produce an output electrical signal;

providing a primary game controller interface comprising an adapter cable port having at least two signal contacts and a ground contact, each of said at least two signal contacts configured to transmit an output electrical signal from a digital-to-analog converter of said at least two digital-to-analog converters;

providing an adapter cable having a first end and a second end, said first end configured to connect to said adapter cable port, and said second end configured to connect to a preselected primary game controller, said adapter cable configured to transmit said output electrical signal from each of said at least two signal contacts of said adapter cable port to said preselected primary game controller.

11. The method of claim 10, further comprising providing a universal serial bus (USB) interface configured to transmit said corresponding digital output values to a universal serial bus (USB) host controller; and outputting each said corresponding digital output value from said microcontroller to said universal serial bus (USB) interface.

12. The method of claim 11, further comprising providing a means for sensing the presence of bus power on the universal serial bus (USB) interface, said microcontroller being configured to direct the output of the digital output values from the microcontroller to the universal serial bus (USB) interface when bus power is detected on the universal serial bus (USB) interface, and said microcontroller being configured to direct the output of the digital output values from the microcontroller to the digital-to-analog converters when bus power is not detected on the universal serial bus (USB) interface.

13. The method of claim 10, wherein the algorithm executable by said microcontroller further comprises determining the corresponding digital output value for a digital sample value by subtracting a stored minimum value from the digital sample value and multiplying the difference by a predetermined scale factor.

14. The method of claim 10, wherein the algorithm executable by said microcontroller further comprises determining whether a digital sample value is greater than a stored maximum value or is less than a stored minimum value and updating said stored maximum value with said digital sample value if said sample value is greater than said stored maximum value or updating said stored minimum value with said digital sample value if said digital sample value is less than said stored minimum value.

15. The method of claim 10, wherein the algorithm executable by said microcontroller further comprises calculating a scale factor by dividing a predetermined output range by the difference obtained by subtracting a stored minimum value from a stored maximum value.

16. The method of claim 14, wherein the algorithm executable by said microcontroller further comprises calculating a scale factor by dividing a predetermined output range by the difference obtained by subtracting a stored minimum value from a stored maximum value; and storing the calculated scale factor.

17. The method of claim 15, wherein the algorithm executable by said microcontroller further comprises storing the calculated scale factor.

18. The method of claim 17, wherein the algorithm executable by said microcontroller further comprises determining the corresponding digital output value for a digital sample value by subtracting a stored minimum value from the digital sample value and multiplying the difference by the stored scale factor.

19. The method of claim 16, wherein the algorithm executable by said microcontroller further comprises determining the corresponding digital output value for a digital sample value by subtracting a stored minimum value from the digital sample value and multiplying the difference by the stored scale factor.

20. The method of claim 19, further comprising outputting each said digital output value to a digital-to-analog converter of said at least two digital-to-analog converters, and producing an output electrical signal.

* * * * *